| (12) | United States Patent<br>Wei et al. | (10) Patent No.: US 11,516,011 B2<br>(45) Date of Patent: Nov. 29, 2022 |
|---|---|---|

(54) BLOCKCHAIN DATA PROCESSING METHODS AND APPARATUSES BASED ON CLOUD COMPUTING

(71) Applicant: ALIPAY (HANGZHOU) INFORMATION TECHNOLOGY CO., LTD., Zhejiang (CN)

(72) Inventors: Changzheng Wei, Hangzhou (CN); Ying Yan, Hangzhou (CN); Hui Zhang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,913

(22) Filed: Jun. 29, 2021

(65) Prior Publication Data

US 2021/0328791 A1 Oct. 21, 2021

(30) Foreign Application Priority Data

Jul. 8, 2020 (CN) .......................... 202010652961.6

(51) Int. Cl.
*H04L 9/30* (2006.01)
*G06F 21/53* (2013.01)
*H04L 9/08* (2006.01)
*H04L 9/32* (2006.01)

(52) U.S. Cl.
CPC ............... *H04L 9/30* (2013.01); *G06F 21/53* (2013.01); *H04L 9/088* (2013.01); *H04L 9/3247* (2013.01); *G06F 2221/033* (2013.01)

(58) Field of Classification Search
CPC ......... H04L 9/30; H04L 9/088; H04L 9/3247; G06F 21/53; G06F 2221/033
See application file for complete search history.

(56) References Cited

U.S. PATENT DOCUMENTS

| 6,704,871 B1 * | 3/2004 | Kaplan .................. G06F 21/72 |
| | | 713/192 |
| 2020/0028693 A1 * | 1/2020 | Wu ....................... H04L 9/3239 |
| 2020/0058019 A1 | 2/2020 | Navin et al. |

(Continued)

FOREIGN PATENT DOCUMENTS

| CN | 107862600 | 3/2018 |
| CN | 108305072 | 7/2018 |
| CN | 108648079 | 10/2018 |

(Continued)

OTHER PUBLICATIONS

Anonymous, "Analysis and Practice of Ant Blockchain Platform BaaS Technology," Jun. 2019, retrieved on Jul. 6, 2021, retrieved from URL <https://translate.google.com/?sl=en&tl=zh-CN&text=anonymous&op=translate>, 16 pages (with machine translation).

(Continued)

*Primary Examiner* — Jeffrey D. Popham
(74) *Attorney, Agent, or Firm* — Fish & Richardson P.C.

(57) ABSTRACT

A blockchain integrated station initiates a ciphertext request to a server, where the ciphertext request includes first information associated with input data of an off-chain contract. The blockchain integrated station obtains, from the server, an execution result, where the execution result is obtained by the server by executing the off-chain contract using the input data.

20 Claims, 7 Drawing Sheets

(56) References Cited

U.S. PATENT DOCUMENTS

2020/0118131 A1* 4/2020 Diriye .................. H04L 9/3239
2020/0159697 A1* 5/2020 Wood ................... H04L 9/3297

FOREIGN PATENT DOCUMENTS

| CN | 108769258 | 11/2018 | | |
|---|---|---|---|---|
| CN | 108900380 | 11/2018 | | |
| CN | 109474584 | 3/2019 | | |
| CN | 111090874 | 5/2020 | | |
| CN | 111090875 | 5/2020 | | |
| CN | 111090888 | 5/2020 | | |
| WO | WO-2019072297 A2 * | 4/2019 | ......... | G06Q 20/3829 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European Appln No. 21182268.9, dated Nov. 10, 2021, 7 pages.
Xiao et al., "Enforcing Private Data Usage Control with Blockchain and Attested Off-chain Contract Execution," arXiv.org, Cornell Univeresity Library, Apr. 15, 2019.

* cited by examiner

BLOCKCHAIN DATA PROCESSING METHODS AND APPARATUSES BASED ON CLOUD COMPUTING

CROSS-REFERENCE TO RELATED APPLICATIONS

This application claims priority to Chinese Patent Application No. 202010652961.6, filed on Jul. 8, 2020, which is hereby incorporated by reference in its entirety.

TECHNICAL FIELD

The present specification relates the field of blockchain technologies, and in particular, to blockchain data processing methods and apparatuses based on cloud computing.

BACKGROUND

Blockchain technology (also called distributed ledger technology) is a decentralized distributed database technology having many characteristics such as decentralization, openness, transparency, immutability and credibility and the like, and thus it is applicable to many application scenarios with high needs for data reliability.

SUMMARY

In view of this, one or more embodiments of the present specification provide blockchain data processing methods and apparatuses based on cloud computing.

To achieve the above-mentioned object, one or more embodiments of the present specification provide the following technical solution.

According to a first aspect of one or more embodiments of the present specification, provided is a blockchain data processing method based on cloud computing, including:

initiating, by a blockchain integrated station, a ciphertext request to a cloud server, where a plaintext request is obtained by the cloud server decrypting the ciphertext request in a maintained trusted execution environment, and the plaintext request includes relevant information for to-be-processed data;

obtaining, by the blockchain integrated station, an execution result returned by the cloud server, wherein the execution result is obtained by the cloud server executing a relevant operation on the to-be-processed data according to the relevant information.

According to a second aspect of one or more embodiments of the present specification, provided is a blockchain data processing method based on cloud computing, including:

receiving, by a cloud server, a ciphertext request initiated by a blockchain integrated station, obtaining a plaintext request by decrypting the ciphertext request in a maintained trusted execution environment to read relevant information for to-be-processed data included in the plaintext request;

executing, by the cloud server, a relevant operation on the to-be-processed data according to the relevant information, and returning an execution result corresponding to the relevant operation to the blockchain integrated station.

According to a third aspect of one or more embodiments of the present specification, provided is a blockchain data processing apparatus based on cloud computing, including:

a request initiating unit, configured to enable a blockchain integrated station to initiate a ciphertext request to a cloud server, wherein a plaintext request is obtained by the cloud server decrypting the ciphertext request in a maintained trusted execution environment, and the plaintext request includes relevant information for to-be-processed data;

a result obtaining unit, configured to enable the blockchain integrated station to obtain an execution result returned by the cloud server, where the execution result is obtained by the cloud server executing a relevant operation on the to-be-processed data according to the relevant information.

According to a fourth aspect of one or more embodiments of the present specification, provided is a blockchain data processing apparatus based on cloud computing, including:

a request obtaining unit, configured to enable a cloud server to receive a ciphertext request initiated by a blockchain integrated station and obtain a plaintext request by decrypting the ciphertext request in a maintained trusted execution environment, to read relevant information for to-be-processed data included in the plaintext request;

an executing unit, configured to enable the cloud server to execute a relevant operation on the to-be-processed data according to the relevant information, and return an execution result corresponding to the relevant operation to the blockchain integrated station.

According to a fifth aspect of one or more embodiments of the present specification, provided is an electronic device, including:

a processor;

a memory for storing processor executable instructions;

wherein the processor implements the method according to the first aspect and the second aspect by running the executable instructions.

According to a sixth aspect of one or more embodiments of the present specification, provided is a computer readable storage medium having computer instructions stored thereon, wherein the instructions are executed by a processor to implement steps in the method according to the first aspect or the second aspect.

DESCRIPTION OF EMBODIMENTS

Figure 1:
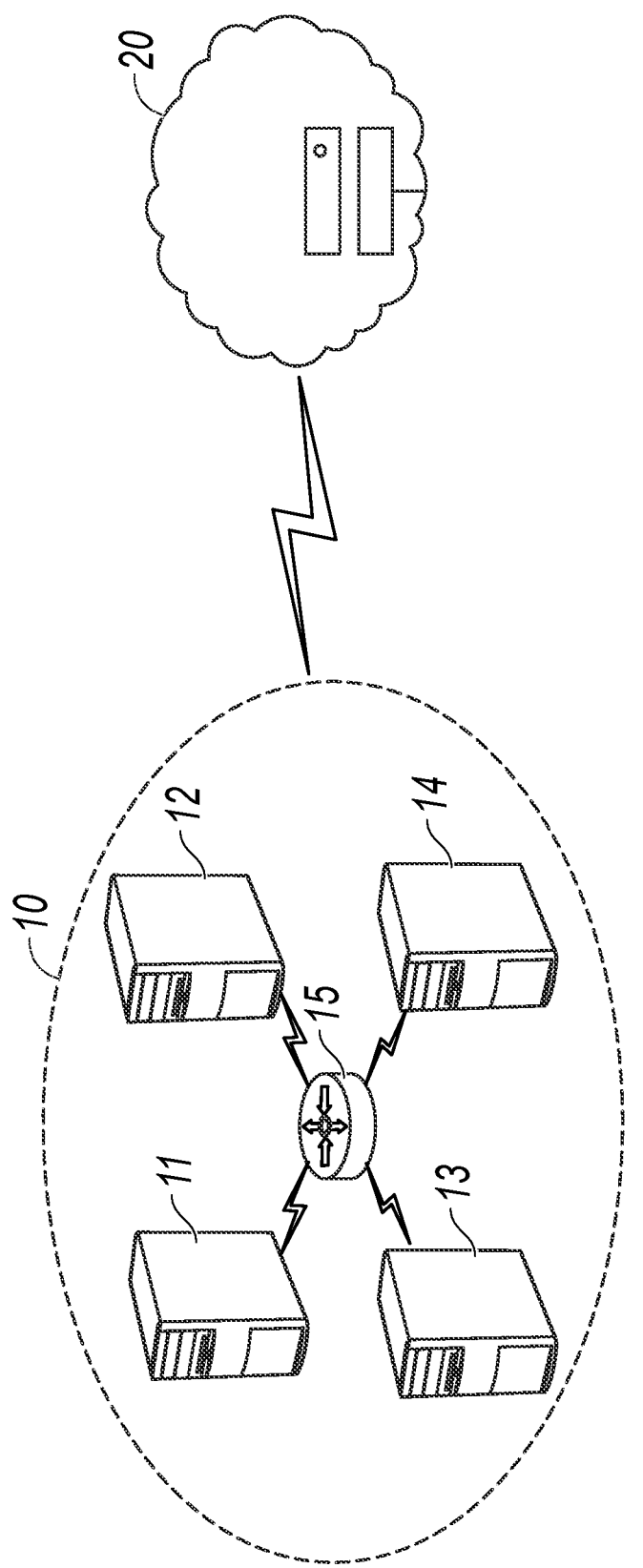
FIG. 1 an architecture diagram of a blockchain data processing system based on cloud computing, according to example embodiments of the present specification.

Example embodiments are described in detail in the present specification with the example embodiments thereof expressed in the drawings. When the following descriptions involve the drawings, same numbers in different drawings represent same or similar elements unless stated otherwise. The implementations described in the following example embodiments do not represent all implementations consistent with one or more embodiments of the present specification. On the contrary, they are merely embodiments of apparatuses and methods consistent with some aspects of one or more embodiments of the present specification described in detail in the appended claims.

It should be noted that the steps of corresponding methods are not necessarily performed according to the sequence shown in the present specification in other embodiments. In some other embodiments, the steps included in the corresponding methods can be more or less than described in the specification. Further, a single step described in the specification may be divided into several steps for descriptions in other embodiments while several steps described in the specification may be combined into a single step for descriptions in other embodiments.

In the early stage of development of the blockchain technology, users mostly add their own personal computer (PC) and laptop computer and the like into a blockchain network to become a blockchain node in the blockchain network. At this time, the stage can be called 1.0 architecture era of blockchain network, in which the behaviors of users to join the blockchain network are autonomous and the users also need to perform autonomous maintenance, for example, perform maintenance and configuration and so on for their devices (for example, PC) joining the blockchain network. Along with continuous development of the blockchain technology, especially along with increasing needs of users for infrastructures with high performance and high availability, the blockchain network develops into 2.0 architecture era based on cloud service. In the 2.0 architecture era, Blockchain-as-a-Service (BaaS) provides fast and convenient solutions for fast blockchain deployment and technical implementation and supports a large number of blockchain service projects. Generally, BaaS is usually built on infrastructures such as public cloud or private cloud, which introduces heavy dependence on infrastructure as well as providing strong deployment capability. However, because blockchain is a typical distributed computing technology, not all nodes can be migrated to clouds but privatization deployment is needed. The additional technical migration and maintenance costs brought by the privatization deployment cause inconsistent technical interfaces and high deployment and maintenance costs during an actual implementation. Therefore, to satisfy the needs of users for privatization and security and the like of the blockchain network, it is necessary to perform further architecture upgrade to the blockchain network, thereby realizing 3.0 architecture era based on blockchain integrated station.

Software and hardware integration can be realized for the blockchain integrated station. When providing a blockchain integrated station, a provider will not only provide hardware devices of the blockchain integrated station to users but also provide software configurations for realizing deep optimizations of the hardware devices integrated into the blockchain integrated station, thereby realizing the software-hardware integration.

Hardware optimization can be realized for the blockchain integrated station. For example, a dedicated smart contract processing chip can be deployed on the blockchain integrated station. For example, the smart contract processing chip can be Field Programmable Gate Array (FPGA) chip, or another type of chip to increase the processing efficiency for a smart contract. A hardware root-of-trust key can be deployed on the smart contract processing chip, for example, the hardware root-of-trust key can be pre-programmed by the provider into the smart contract processing chip and the provider can also know a public key corresponding to the hardware root-of-trust key (for example, the key is disclosed). Therefore, the smart contract processing chip can send negotiation information to the provider and sign the negotiation information by using the hardware root-of-trust key, so that the provider can verify the signature based on the corresponding public key; and, after successful signature verification, it is ensured that the smart contract processing chip and the provider obtain the same key through negotiation based on the negotiation information. The negotiated key can include an image deployment key, and thus the provider can encrypt and transmit a binary disk image needed by the blockchain node to the smart contract processing chip based on the image deployment key, and the smart contract processing chip can decrypt and deploy the binary disk image based on the image deployment key. The negotiated key can include a service secret deployment key, and thus the provider can encrypt and transmit a node private key of the blockchain node, a service root key of the blockchain node, etc., to the smart contract processing chip based on the service secret deployment key, and the smart contract processing chip can obtain and deploy the node private key and the service root key and the like based on the service secret deployment key, to satisfy the privacy transaction needs in a blockchain scenario. For example, the node private key corresponds to a node public key, and thus a client device can perform encryption and transmission for a blockchain transaction by using the node public key, and the blockchain node can perform decryption by using the node private key. The service root key is a symmetric key which can be used to perform encrypted storage for service data such as contract codes and value of contract status and the like. The service root key may not be directly used, and the smart contract processing chip can perform encryption and decryption through a derivation key of the service root key to reduce the security risk of the service root key. Through reliable management for the node private key and the service root key (or its derivation key), data will be always in encrypted state unless processed by the smart contract processing chip. Therefore, the smart contract processing chip actually forms a TEE (Trusted Execution Environment) of hardware on the blockchain integrated station, so as to ensure the data that needs privacy protection such as transactions, contract codes, and contract statuses will not be leaked.

For another example, an intelligent network card can be deployed on the blockchain integrated station. In addition to realizing a traditional network card function, the intelligent network card also can replace or assist a CPU of the blockchain integrated station to perform partial functions so as to offload computation of the CPU. Especially, the operations with intensive network I/O can be transferred from CPU to the intelligent network card to perform, so that the CPU can process more computation-intensive operations, for example, transaction processing, storage processing and the like. Compared with other components (for example, CPU) on the blockchain integrated station, the intelligent network card is closer to the network regardless of physical level or logical level, so the intelligent network card can always fetch data transmitted in the network preferentially. Therefore, with no storage access or a small amount of storage access is involved, the intelligent network card can process these data with a relatively higher processing efficiency and a relatively smaller delay, and a relatively larger throughput, so as to achieve a higher performance benefit with a lower cost. For example, in consensus algorithm, there is almost no need to access storage except in the cases of change of network status, addition and deletion of node, change of consensus configuration and the like. Therefore, the consensus operation can be completed by the intelligent network card and only need to inform the CPU of a consensus result. Therefore, the CPU is not needed to directly join the consensus process, thereby significantly improving the consensus efficiency. Similarly, the same effect can be achieved in forwarding transactions by the intelligent network card and achieving block synchronization by the intelligent network card on a newly-added blockchain node and the like, and will not be repeated in the present specification. Furthermore, after receiving transactions, the intelligent network card can identify or filter out a replay transaction by comparing the received transaction with historical transactions, for example, comparing data fields of sender information of transaction, destination address, time stamp, and hash value and the like. The intelligent network card can also perform content analysis for those received transactions, so as to filter out illegal transactions or predefined undesired transactions and the like, as a supplementation to layer-2 or layer-3 packet filtering implemented by a switch.

For another example, a cryptographic acceleration card which is also called a high-speed cryptographic card, can be deployed on the blockchain integrated station. The cryptographic acceleration card can realize total encrypted memory, defend against side-channel attacks by hardware reinforcement, and also realize physical protection against approaches such as probe, laser and the like, having very high security. For example, the cryptographic acceleration card used on the blockchain integrated station can have level-2 qualification from the State Cryptography Administration, level-3 qualification from the State Cryptography Administration and the like. When the cryptographic acceleration card is deployed, the hardware roof-of-trust key as described above can be maintained in the cryptographic acceleration card, and the cryptographic acceleration card can perform signature operation based on the hardware roof-of-trust key and replace or assist the smart contract processing chip to complete the operations such as the key negotiation as described above. Similarly, the cryptographic acceleration card can be used to maintain a public key so that the cryptographic acceleration card can realize signature verification operation based on the maintained public key. In short, at least part of operations relating to key management, encryption and decryption, and signature verification and the like on the blockchain integrated station can be handed over to the cryptographic acceleration card, so that very high security can be realized and task offloading can be realized for the CPU of the blockchain integrated station or the smart contract processing chip, thereby improving the processing efficiency.

Software optimization can be realized for the blockchain integrated station. For example, a certificate authority service can be built in the blockchain integrated station to realize automatic certificate issuing, node identity authentication, automatic blockchain construction, and automatic adding of blockchain node, thereby realizing the plug and play of the blockchain integrated station. In this case, a user can realize fast deployment of the blockchain integrated station. For example, a private blockchain network can be quickly established among a plurality of blockchain integrated stations to satisfy the needs of users for privatization, security, privacy and the like. For another example, the blockchain integrated station can integrate a standardized on-cloud service interface, to enable the blockchain integrated station to automatically connect to on-cloud service, thereby realizing hybrid deployment between the blockchain integrated station and a cloud-deployed cloud server, to construct a hybrid blockchain network. The cloud server can serve as an off-chain node relative to a blockchain network constructed by the blockchain integrated stations, or as a cloud blockchain node to construct a blockchain network together with the blockchain integrated stations. The blockchain integrated station can also integrate a standardized cross-chain service interface, to enable the blockchain integrated station to realize cross-chain services based on a standardized cross-chain protocol or standardized cross-chain service, thereby greatly expanding the application scenarios of the blockchain integrated station, and satisfying the cross-chain needs of users. For example, cross-chain data interaction between different blockchain networks is achieved, and for another example, cross-chain data interaction between the blockchain network and an off-chain computing node and the like is achieved (for example, the off-chain computing node shares computation task for the blockchain node and the like).

In a scenario of hybrid deployment of a blockchain integrated station and a cloud server, the present specification provides a blockchain data processing solution based on cloud computing, which will be described below in combination with the accompanying drawings.

FIG. 1 is an architecture diagram of a blockchain data processing system based on cloud computing according to example embodiments of the present specification. As shown in FIG. 1, a blockchain network 10 can include a total of four blockchain integrated stations, which are a blockchain integrated station 11, a blockchain integrated station 12, a blockchain integrated station 13, a blockchain integrated station 14 respectively. Of course, the number of the blockchain integrated stations is not limited by the present specification. The blockchain integrated stations 11-14 are all connected to a switch 15 so that the blockchain integrated stations 11-14 are actually connected to a same local area network. In addition, the blockchain integrated station 11 can also connect to an on-cloud service (for example, the BaaS service), for example, to a cloud server 20. Of course, the blockchain integrated station 11 can also connect to a plurality of cloud servers. The number of the cloud servers is not limited by the present specification. By connecting the blockchain integrated station 10 to the on-cloud service, the on-cloud service can provide high-performance and high-availability infrastructures to the blockchain integrated station 10 through high-performance cloud servers and cloud computing.

Figure 2:
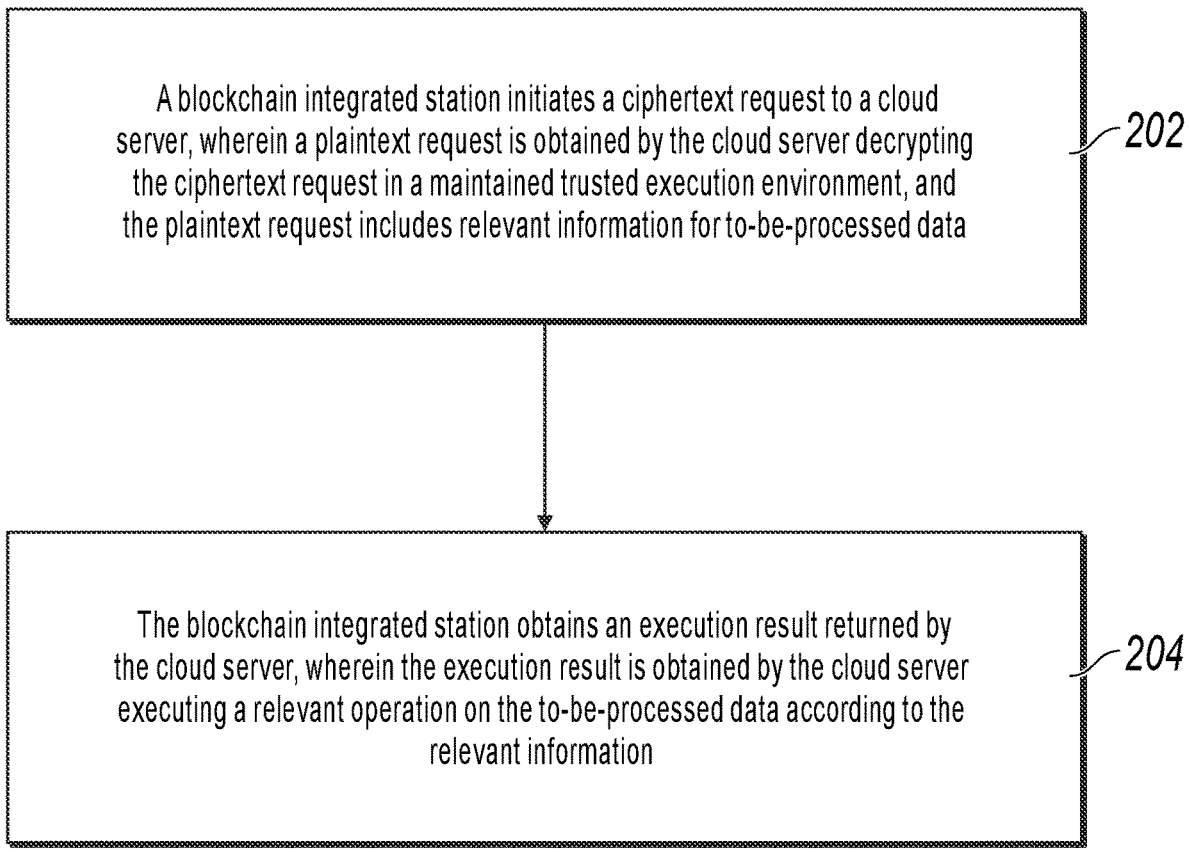
FIG. 2 is a flowchart of a blockchain data processing method based on cloud computing at blockchain integrated station side, according to example embodiments of the present specification.

FIG. 2 is a flowchart of a blockchain data processing method based on cloud computing at blockchain integrated station side according to example embodiments of the present specification. As shown in FIG. 2, the method can include the following steps.

At step 202, a blockchain integrated station initiates a ciphertext request to a cloud server, where a plaintext request is obtained by the cloud server decrypting the ciphertext request in a maintained trusted execution environment, and the plaintext request includes relevant information for to-be-processed data.

In an embodiment, to ensure data security of the blockchain integrated station after connecting to a cloud, a trusted execution environment (TEE) can be established on the cloud server. The blockchain integrated station initiates a request to the cloud server in the form of ciphertext, and the cloud server obtains the plaintext request by decrypting the ciphertext request in the TEE maintained by itself, so as to obtain data included in the plaintext request.

TEE is a security extension based on CPU hardware and is a trusted execution environment completely isolated from outside. The concept of TEE was proposed by Global Platform for the first time to realize secure isolation of resources on mobile devices and provide, parallel to operating systems, secure and trusted execution environment for application programs. At present, the industry pays much attention to the TEE solutions and almost all main chip and software alliances have their own TEE solutions, such as software Trusted Platform Module (TPM), hardware Intel Software Guard Extensions (SGX), ARM Trustzone, and AMD Platform Security Processor (PSP). For example, TEE can be deployed by Intel SGX (SGX for short below) or the previously described FPGA.

Intel SGX technology (hereinafter called SGX) is taken as an example. Based on SGX technology, the cloud server can create an enclave to be used as a TEE for responding to a request initiated by the blockchain integrated station. By using a newly-increased processor instruction in a CPU, the cloud server can allocate a zone in a memory as Enclave Page Cache (EPC) to allow the enclave to reside. The memory zone corresponding to the EPC is encrypted by a memory encryption engine (MEE) inside the memory. The contents (codes and data in the enclave) of the memory zone can be decrypted only in a CPU core, and a key for encryption and decryption can be generated only when the EPC is started and stored in the CPU. Thus, the security boundary of the enclave only includes itself and the CPU. The enclave cannot be accessed by any software, privileged or non-privileged, even an operating system administrator or a virtual machine monitor (VMM) (also referred to as hypervisor) cannot affect the codes and data in the enclave, thus having extremely high security. Furthermore, under the precondition of the security guarantee, the CPU can process requests of plaintext in the enclave with an extremely high operation efficiency, thus ensuring both data security and computing efficiency.

At step 204, the blockchain integrated station obtains an execution result returned by the cloud server, where the execution result is obtained by the cloud server executing a relevant operation on the to-be-processed data according to the relevant information.

With the blockchain integrated station as a blockchain node, the operation of transferring data from on chain to off chain, or from off chain to on chain can be realized through an oracle mechanism, where the oracle mechanism refers to a cooperation mechanism between an oracle contract and an oracle server in the present specification. Specifically, the blockchain integrated station can generate an event including a ciphertext request by calling the oracle contract (for example, creating a transaction calling the oracle contract), and the oracle server can monitor the event generated by the oracle contract. When the oracle server monitors the event including the cipher test request, the oracle server reads the ciphertext request from the event and sends the ciphertext request to the cloud server. Similarly, the cloud server can send an execution result to the oracle server which returns the execution result to the oracle contract, and thus the blockchain integrated station obtains the execution result.

In an embodiment, the blockchain integrated station can construct a blockchain network and the cloud server serves as an off-chain node relative to the blockchain network. Based on a decentralized architecture of the blockchain network, each blockchain transaction on a blockchain needs to be executed on all blockchain nodes in the blockchain network, so that blockchain ledger data maintained by all blockchain nodes are consistent. If a transaction logic is simple, for example, taking bitcoin as example, the blockchain transaction is used only to realize a transfer operation, excessive resource consumption will not be caused even if the blockchain transaction is to be executed on all blockchain nodes. But, if the blockchain provides a smart contract function and the blockchain transaction calls the smart contract, it will be quite different. The smart contract on the blockchain is a contract that can be triggered and executed by a transaction on a blockchain system, and the smart contract can be defined in the form of codes.

Taking Ethereum as an example, users are supported to create and call some complex logics in an Ethereum network, which is the largest challenge of the Ethereum different from bitcoin blockchain technology. The core of the Ethereum as a programmable blockchain is Ethereum virtual machine (EVM) which can be run by each Ethereum node. EVM is a Turing complete EVM, which means various complex logics can be realized through the EVM. The smart contracts provided and called by users in the Ethereum are all run on the EVM. Actually, the EVM directly runs virtual machine codes (virtual machine bytecodes, hereinafter called "bytecodes"). The smart contract includes two stages, i.e. deployment and call.

In the deployment stage, a user sends a transaction containing information for creating a smart contract to the Ethereum network, where the data field of the transaction includes codes of the smart contract (e.g. bytecode), and the to field of the transaction is null. Each node in the Ethereum network executes the transaction through EVM respectively and generates a corresponding contract instance. After an agreement is reached among nodes through a consensus mechanism, the smart contract corresponding to the transaction is successfully created. A contract account corresponding to the smart contract is present on the blockchain and has a specific contract address, contract codes (i.e. codes of the smart contract) or hash values of the contract codes are stored in the contract account, and the contract codes are used to control corresponding behaviors of the smart contract.

In the call stage, a user (same as or different from the user deploying the smart contract) sends a transaction for calling a smart contract to the Ethereum network, where the from field of the transaction is an address of an external account corresponding to the user, and the to field of the transaction is an address of the smart contract to be called, and the data field of the transaction includes method and parameter for calling the smart contract. After an agreement is reached among nodes through the consensus mechanism, the smart contract declared to be called by the transaction is independently executed by each node of the Ethereum network in a specified manner and all execution records and data are stored on the blockchain. After the transaction is completed, an immutable and permanent transaction credential is stored on the blockchain.

As described above, EVM is a Turing complete virtual machine. Similarly, other blockchains can also adopt another type of virtual machine, for example, WebAssembly (WASM) virtual machine and the like. In one word, when a smart contract called by a transaction is used to realize a relatively complex logic, the process in which a node executes the codes of the smart contract through a virtual machine will consume more computing resources. Furthermore, because all nodes in the blockchain network need to execute the codes of the smart contract, the computing resource consumption will be multiplied along with increase of nodes. Therefore, although the TEE technology can reduce resource consumption of a single blockchain node and speed up transaction execution efficiency, an extremely large amount of resource consumption and wastes will be caused in the entire blockchain network.

For the above-mentioned problem, a cloud server can be deployed on a cloud as an off-chain node relative to a blockchain network, so that a computing operation that originally needs to be executed on all blockchain nodes can be transferred to the off-chain node for execution. In this case, the blockchain nodes only need to obtain a computation result from the off-chain node and update blockchain ledger data based on the computation result. The blockchain node can further prove the computation result is indeed executed as desired in the TEE based on Verifiable Computation technology. When the cloud servers serve as off-chain nodes, it is not required for all cloud servers to execute the same computation operation like the blockchain nodes. In this way, on-chain resource consumption can be reduced while the reliability is ensured. As mentioned above, the smart contract can be deployed on the blockchain node so that the blockchain node can execute the codes of the smart contract to realize corresponding computing requirements. Similarly, the codes for executing a computation task can be deployed on an off-chain node, so that the off-chain node can execute the codes to realize corresponding computing requirements. For convenience of understanding, a contract deployed on a blockchain node is referred to as an on-chain contract, and a contract deployed on an off-chain node is referred to as an off-chain contract. Of course, in essence, each of the on-chain contract and the off-chain contract is a segment of codes executable in a virtual machine.

When a TEE is created on a cloud server, an off-chain contract can be pre-deployed on the cloud server and a WASM virtual machine is deployed inside the TEE created by the cloud server. In this case, a computation task based on WASM program is initiated to the cloud server, the cloud server can read the off-chain contract into TEE and compile it into WASM bytecodes such that the compiled WASM bytecodes are executed in the WASM virtual machine with the WASM virtual machine as an execution engine. In this scenario, the previously described ciphertext request (or the plaintext request) is a request calling the off-chain contract, the to-be-processed data is to-be-computed data, and the relevant information includes the to-be-computed data and a contract address of the off-chain contract for computing the to-be-computed data. Thus, the cloud server can determine the off-chain contract deployed by itself based on the contract address, read the to-be-computed data and the determined off-chain contract into TEE, and then compile the off-chain contract into bytecodes, such that the bytecodes are executed by an execution engine deployed in the TEE to compute the to-be-computed data.

Figure 3:
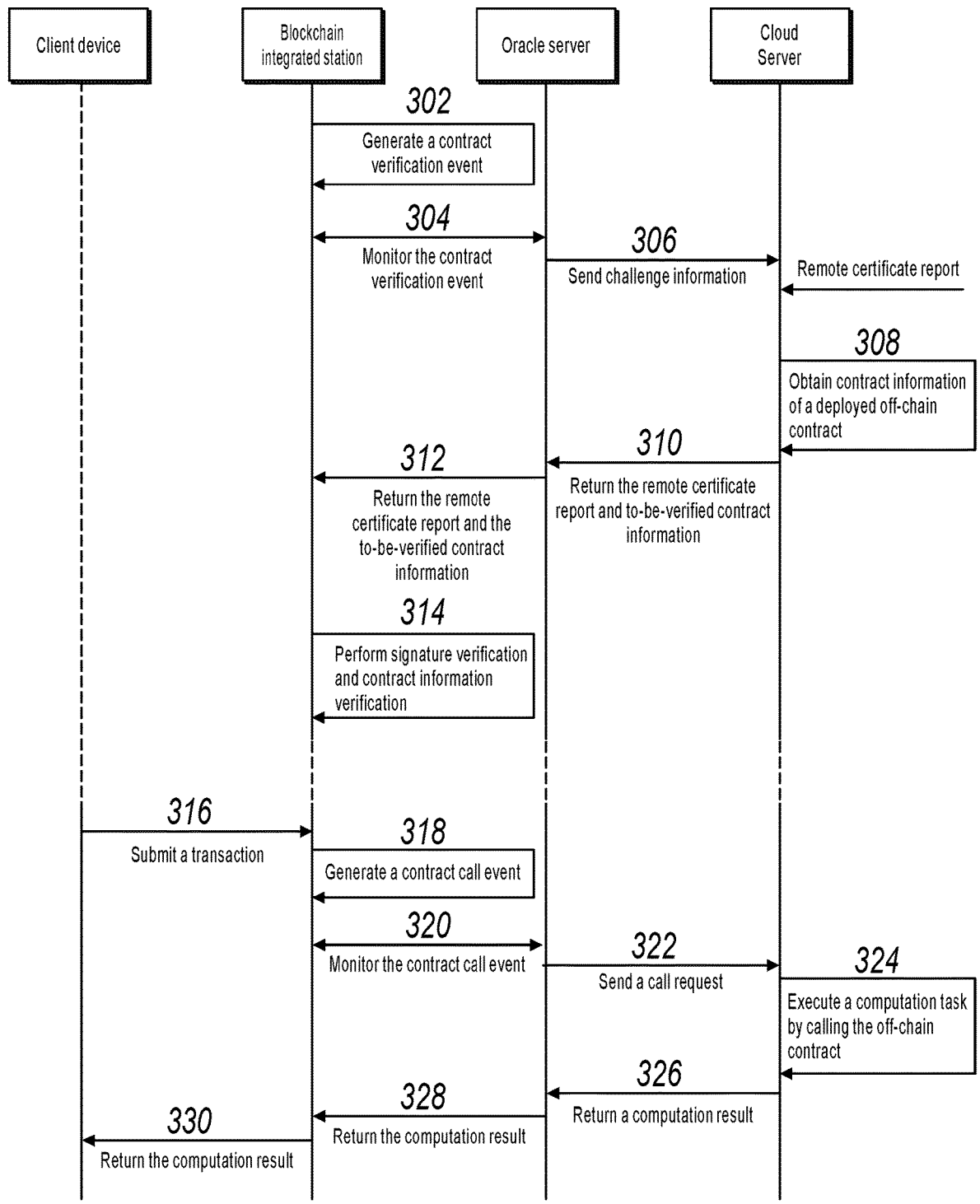
FIG. 3 is an interaction diagram of performing an off-chain computing task by calling a cloud server, according to example embodiments of the present specification.

For convenience of understanding, the process of calling the cloud server to perform an off-chain computation task will be detailed described in combination with specific embodiments and FIG. 3.

FIG. 3 is an interaction diagram of calling a cloud server to perform an off-chain computation task according to example embodiments of the present specification. As shown in FIG. 3, the interaction process can include the following steps.

At step 302, a contract verification event is generated by a blockchain integrated station.

In this embodiment, before calling the off-chain cloud server to perform a computation task, the blockchain integrated station as a blockchain node in a blockchain network can firstly verify the off-chain contract deployed on the cloud server is trustworthy. Data transfer can be realized between the blockchain node and the off-chain cloud server through an oracle mechanism.

At step 304, the contract verification event is monitored by an oracle server.

At step 306, the oracle server sends challenge information to the cloud server.

At step 308, the cloud server obtains contract information of the deployed off-chain contract.

At step 310, the cloud server returns a remote certificate report and to-be-verified contract information to the oracle server.

At step 312, the oracle server returns the remote certificate report and the to-be-verified contract information to the blockchain integrated station.

In this embodiment, the blockchain integrated station can call a pre-deployed oracle contract which can generate the contract verification event containing the challenge information, and the oracle server can obtain the challenge information by monitoring the event generated by the oracle contract, and send the challenge information to the cloud server through an off-chain channel. After receiving the challenge information, the cloud server can obtain the remote certificate report for the TEE deployed by itself and the contract information of the off-chain contract deployed by itself (as to-be-verified contract information) respectively.

Taking Intel SGX technology as an example, the TEE creates an enclave for realizing off-chain computation on the cloud server, and the remote certificate process also involves another special enclave on the cloud server, i.e. quoting enclave (QE for short), which is an architectural enclave provided and signed by Intel. The QE firstly needs to generate a REPORT structure for local authentication, the QE verifies whether the enclave is on the same platform as itself based on the REPORT structure, and then the QE encapsulates the REPORT structure in a data structure QUOTE (i.e. self-recommendation information), and signs it using an enhanced privacy identification (EPID) key. The EPID key represents not only the cloud server but also credibility of underlying hardware of the cloud server, and also can bind information such as version of processor firmware. Only QE can access the EPID key so as to sign the data structure QUOTE. In the SGX technology, the authentication server can be an Intel Attestation Service (IAS) server provided by Intel. The cloud server sends the signed data structure QUOTE to the IAS server so that the IAS server can verify the signature, and return a corresponding remote certificate report to the cloud server.

After creating the TEE, the cloud server generates the self-recommendation information for a remote certificate. The self-recommendation information can be used to anchor and fix the information of the TEE, so that the remote certificate report containing the self-recommendation information obtained finally can represent the state of the TEE and verify whether the TEE is trustworthy. For example, the self-recommendation information can contain a first to-be-checked hash value which is a hash value of predetermined information in the TEE, for example, the predetermined information can include all codes deployed in the TEE and a public key of developer of the TEE and the like. Taking Intel SGX technology as example, the hash value generated corresponding to all codes deployed in the TEE is MREnclave, and hash value generated corresponding to the public key of the developer of the TEE is MRSigner, that is, the first to-be-checked hash value can include MREnclave and MRSigner.

Still taking Intel SGX technology as example. As described above, after the cloud server sends the signed data structure QUOTE to the IAS server, the IAS server performs signature verification according to a maintained public key set, and returns the remote certificate report (i.e. AVR report) to the cloud server, where the remote certificate report includes the data structure QUOTE and a signature verification result. Further, the IAS server can sign the remote certificate report using its own private key.

Correspondingly, after obtaining the remote certificate report, the blockchain integrated station can firstly perform signature verification for the remote certificate report using a public key of the IAS server. If the verification is successful, it indicates that the remote certificate report is indeed generated by the IAS server, and is not tampered or loses data during data transmission process. The blockchain integrated station can obtain the public key of the IAS server through any approach. For example, when the remote certificate report is provided to the blockchain integrated station, a certificate chain of the IAS can also be provided in associated manner, so that the blockchain integrated station can obtain the public key of the IAS server from the certificate chain. Afterwards, the blockchain integrated station can obtain the data structure QUOTE and the signature verification result from the remote certificate report. The blockchain integrated station can firstly check the signature verification result. If the signature verification result is successful verification, it indicates that the CPU of the cloud server holds the private key provided by Intel. Thus, the TEE is created on a reliable hardware platform and other verification operations can be continued. If the signature verification result is unsuccessful verification, the blockchain integrated station determines the cloud server is unreliable, and does not need to continue other verification operations. Next, the blockchain integrated station can obtain the hash values MREnclave and MRSigner from the data structure QUOTE, i.e. to-be-checked MREnclave and to-be-checked MRSigner. At the same time, the blockchain integrated station pre-obtains the first standard hash value of the predetermined information of the TEE, for example, trusted values of MREnclave and MRSigner (hereinafter referred to as trusted MREnclave and trusted MRSigner), and then compares the to-be-checked MREnclave with the trusted MREnclave, and the to-be-checked MRSigner with the trusted MRSigner. In this way, the blockchain integrated station can determine "the to-be-checked MREnclave is consistent with the trusted MREnclave, and the to-be-checked MRSigner is consistent with the trusted MRSigner" as a precondition for determining the TEE is trustworthy. In other words, if the to-be-checked MREnclave is inconsistent with the trusted MREnclave, or the to-be-checked MRSigner is inconsistent with the trusted MRSigner, the blockchain integrated station determines the TEE of the cloud server is un-trustworthy. If all preconditions set by the blockchain integrated station are satisfied, it is determined that the TEE of the cloud server is trustworthy. In addition, for the blockchain integrated station, there is no necessary precedence between the verification operation of the signature verification result and the verification operation of the to-be-checked MREnclave and the to-be-checked MRSigner and thus both operations can be performed independently.

At step 314, the blockchain integrated station performs signature verification and contract information verification.

In a case of determining the TEE of the cloud server is trustworthy according to the remote certificate report, the blockchain integrated station obtains to-be-verified contract information of the off-chain contract deployed on the cloud server, where the to-be-verified contract information is signed by the cloud server in the TEE using its own identity private key, and the identity private key is generated and maintained by the cloud server in the TEE. For example, the cloud server can read the deployed off-chain contract into the TEE and sign it using its own identity private key.

The blockchain integrated station performs signature verification for the to-be-verified contract information using the identity public key of the cloud server, and performs contract information verification for the to-be-verified contract information according to the contract information of the off-chain contract, where the identity public key is in a disclosed state, for example, the cloud server provides the identity public key to allow the blockchain integrated station to obtain it. At the same time, the contract information of the off-chain contract is also in a disclosed state, for example, a deployer of the off-chain contract provides the contract information to allow the blockchain integrated station to obtain it, where the contract information can include name, description, version number, bytecode hash value, contract identity public key and the like of the off-chain contract, which is not limited by the present specification.

When both the signature verification and the contract information verification are passed, the blockchain integrated station can determine that the off-chain contract is executed by the cloud server in the TEE when the blockchain integrated station initiates call to the off-chain contract through the oracle mechanism. The process of verifying the off-chain contract is started by verifying the TEE of the cloud server is trustworthy in the present specification. In a case of verifying the TEE of the cloud server is trustworthy, if it is known by signature verification that the to-be-verified contract information provided by the cloud server is indeed signed by the identity private key of the cloud server (maintained in the TEE), it is determined that the off-chain contract challenged currently is an off-chain contract running in the TEE of the cloud server. Next, in a case that the to-be-verified contract information is further successfully verified, it indicates that the contract information of the off-chain contract running in the TEE of the cloud server is correct, and thus it is finally determined that the off-chain contract deployed on the cloud server is trustworthy and can perform computation task as desired.

At step 316, a client device submits a transaction to the blockchain integrated station.

In one case, a transaction submitted by the client device directly includes an encrypted call request, and therefore, the blockchain integrated station can obtain a ciphertext request by decrypting the transaction in the TEE maintained by the blockchain integrated station, and then transmit the ciphertext request to the cloud server through the oracle mechanism.

In another case, a transaction submitted by the client device includes raw data (or description information of the raw data, for example, the description information can be a storage address), the blockchain integrated station can obtain corresponding input parameter data (to-be-processed data) by processing the raw data through execution of an on-chain contract. After the on-chain contract is executed, the contract address of the off-chain contract and the input parameter data are packaged into a call request which is then encrypted. Alternatively, the transaction generated by the client device can include description information of the raw data. Because the client device does not directly add the input parameter data into the transaction, and the process in which off-chain computation is performed by calling the off-chain contract is transparent, the client device only needs to obtain a computation result fed back without paying attention to that the called contract is on or off chain.

It should be noted that the encryption and transmission of the call request can be implemented by symmetric encryption, asymmetric encryption or a combination thereof, thereby ensuring content of the call request will not be leaked during transmission process. Reference can be made to the applications of related technology, and thus redundant descriptions will not be made in the present specification.

At step 318, the blockchain integrated station generates a contract call event.

At step 320, an oracle server monitors the contract call event.

At step 322, the oracle server sends the call request to the cloud server.

In this embodiment, after verifying the off-chain contract deployed on the cloud server is trustworthy through the previously described steps, the blockchain integrated station transfers computation task to the cloud server for execution. Specifically, the blockchain integrated station initiates a call request to the cloud server through the oracle mechanism, and the cloud server returns a computation result through the oracle mechanism. For example, the blockchain integrated station generates the contract call event including a call request. When monitoring the contract call event, the oracle server reads the call request included in the contract call event, and sends it to the cloud server which decrypts the call request in the maintained TEE so as to respond.

At step 324, the cloud server executes computation task by calling the off-chain contract.

At step 326, the cloud server returns a computation result to the oracle server.

At step 328, the oracle server returns the computation result to the blockchain integrated station.

After obtaining the computation result, the blockchain integrated station (as a blockchain node) can broadcast the computation result in a blockchain network, so that all blockchain nodes obtain the computation result, and further update a blockchain ledger according to the computation result.

At step 330, the blockchain integrated station returns the computation result to the client device.

In the above-mentioned embodiment, the cloud server, as an off-chain node, executes computation task in place of the blockchain node. In addition, the cloud server can also serve as a cross-chain agency service node to connect with a plurality of different blockchain networks, so as to realize cross-chain data access.

In this scenario, the previously described ciphertext request (or plaintext request) is a cross-chain data access request, the to-be-processed data is to-be-accessed data which is stored in another blockchain network different from the blockchain network where the blockchain integrated station is located, and the relevant information includes address information of the to-be-processed data. In this case, in response to the cross-chain data access request, the cloud server can serve as a cross-chain agency service node to perform cross-chain access to the other blockchain network according to the address information, so as to obtain the to-be-accessed data and return the to-be-accessed data to the blockchain integrated station. The cloud server in the present specification can serve as a cross-chain relay to perform cross-chain access to the data in the blockchain network according to cross-chain technology of related technology (for example, side chain technology, notary technology and the like which are not limited by the present specification), which will not be repeated in the present specification.

In the blockchain data processing solution based on cloud computing in the present specification, in addition to serving as the off-chain node and the cross-chain agency service node, the cloud server can also serve as a certificate authority (CA) authority node to issue a digital certificate to a blockchain integrated station allowed to join the blockchain network. It should be noted that the cloud server can have the functions of the off-chain node, cross-chain agency service node and CA authority node at the same time, or the three different functions can be realized by different cloud servers respectively. In other words, the cloud server can serve as at least one of the off-chain node, cross-chain agency service node and CA authority node.

In a scenario where the cloud server serves as a CA authority node, the to-be-processed data includes a second identity public key of the blockchain integrated station applying to join a blockchain network, and the previously described relevant information includes second description information of the blockchain integrated station.

A certificate authority service (CA service) can be built in the cloud server, which is equivalent to configuring the cloud server as a CA authority center of the blockchain network, to realize autonomous certificate issuing. After starting the CA service, the cloud server can firstly generate a root certificate for itself based on the CA service, and broadcast the root certificate in the blockchain network so that the blockchain nodes in the blockchain network can obtain the root certificate.

When issuing a certificate, the CA service needs to use an identity key of the cloud server. It is assumed that the cloud server creates a first identity key including a first identity private key and a corresponding first identity public key. Further, the cloud server provides the first identity private key to the CA service, so that the CA service signs the first identity public key and first description information of the cloud server by using the first identity private key, to generate the root certificate. Because the cloud server generates the digital certificate by signing its own public key using its own private key, the digital certificate corresponding to the cloud server is the root certificate or called self-signed certificate.

The cloud server needs to maintain the first identity private key properly but can disclose the first identity public key at discretion. Of course, the first identity public key is actually included in the root certificate. Therefore, after receiving the root certificate, the blockchain node in the blockchain network can obtain the first identity public key from the root certificate, and perform signature verification for the root certificate according to the first identity public key. If the signature verification is successful, the blockchain node can determine that the root certificate is valid. Similarly, the blockchain integrated station not joining the blockchain network can obtain the root certificate of the cloud server (for example, request the root certificate from the cloud server or obtain through the broadcast of the cloud server), obtain the first identity public key from the root certificate, and perform signature verification for the root certificate using the first identity public key. If the verification is successful, the blockchain integrated station determines that the cloud server is the CA authority node, and further applies to the cloud server to join the blockchain network and obtains a corresponding digital certificate.

Similar to the cloud server, the blockchain integrated station applying to join the blockchain network (hereinafter referred to as a pending blockchain integrated station) also creates its own identity key. It is assumed that the pending blockchain integrated station creates a second identity key, and the second identity key specifically includes a second identity private key and a second identity public key. An authentication application initiated by the pending blockchain integrated station can include the second identity public key (i.e. the previously described to-be-processed data) and description information of the pending blockchain integrated station (i.e. the previously described relevant information). The pending blockchain integrated station needs to maintain the second identity private key properly. Correspondingly, after the cloud server provides the received authentication application to the CA service, the CA service can sign the second identity public key and the second description information of the pending blockchain integrated station and the first description information of the cloud server through the first identity private key, to generate a digital certificate corresponding to the pending blockchain integrated station.

Because the digital certificate corresponding to the cloud server is signed by its own first identity private key, the first identity public key can be obtained directly from the digital certificate to complete the signature verification. The digital certificate corresponding to the blockchain integrated station is also signed by the first identity private key of the first blockchain integrated station, but the public key included in the digital certificate is the second identity public key corresponding to the blockchain integrated station. Thus, it is needed to obtain the root certificate according to the first description information of the cloud server included in the digital certificate, and verify the signature included in the digital certificate corresponding to the blockchain integrated station according to the first identity public key included in the root certificate. Therefore, a chain type relationship, i.e. a certificate chain, is formed between the digital certificate corresponding to the cloud server and the digital certificate corresponding to the blockchain integrated station. Because the digital certificate corresponding to the cloud server is located at the position of the "root", its digital certificate can be referred to as a root certificate.

Before generating the digital certificate of the pending blockchain integrated station, the cloud server can verify the second description information of the pending blockchain integrated station, so as to generate the digital certificate in a case of successful verification, that is, whether the pending blockchain integrated station is allowed to join the blockchain network is determined by verifying the second description information. In a case of unsuccessful verification, it indicates that the pending blockchain integrated station is not authenticated, thus the operation of generating the digital certificate of the pending blockchain integrated station is not performed.

In addition to this, the blockchain nodes in the current blockchain network can also be allowed to join the process of determining whether to allow the pending blockchain integrated station in the blockchain network. As an example embodiment, the cloud server can send the second description information of the pending blockchain integrated station to a target blockchain network, so that the blockchain nodes in the target blockchain network determine whether to allow the pending blockchain integrated station in the target blockchain network according to the second description information. Therefore, in a case of determining as allowed, the blockchain nodes in the blockchain network generate a joining application confirmation message for the pending blockchain integrated station based on the second description information and return the message to the cloud server. In a case of obtaining the joining application confirmation message, the cloud server can generate a digital certificate for the pending blockchain integrated station. At the same time, the blockchain nodes in the target blockchain network can store the second description information of the pending blockchain integrated station, so that the second description information can be used to verify the digital certificate provided by the pending blockchain integrated station when the blockchain integrated station joins the target blockchain network subsequently. For example, the blockchain node can maintain a node information list to record the description information of the blockchain integrated stations allowed to join the target blockchain network. Alternatively, the cloud server can send the second description information of the pending blockchain integrated station to the target blockchain network by submitting a transaction, so that the second description information of the pending blockchain integrated station is recorded in the blocks of the target blockchain network.

As can be seen, a precondition under which the cloud server generates a digital certificate for the pending blockchain integrated station can include the following: the cloud server successfully verifies the second description information of the pending blockchain integrated station, and/or, the target blockchain network generates a joining application confirmation message for the pending blockchain integrated station based on the second description information sent by the cloud server. Of course, the specific form of the precondition can be flexibly selected according to actual situations, which is not limited by the present specification.

Based on the manner of generating the digital certificate, the digital certificate issued by the CA service can be used to indicate that a device corresponding to the digital certificate already passes identity authentication of the CA service. Thus, by verifying the digital certificate of a blockchain integrated station, the blockchain integrated station can be determined as a blockchain node in the blockchain network in a case of successful verification. In other words, the digital certificate of any blockchain integrated station can be successfully verified by any blockchain node in the target blockchain network using the root certificate, and thus determined by the any blockchain node as a precondition for allowing the any pending blockchain integrated station in the target blockchain network.

Specifically, the blockchain node in the blockchain network can receive a to-be-verified digital certificate sent by a pending blockchain integrated station, and perform signature verification for the to-be-verified digital certificate using the first identity public key included in the root certificate, so as to determine the to-be-verified digital certificate is issued by the CA service stated on the cloud server in a case of successful signature verification. Furthermore, the to-be-verified digital certificate includes the second description information of the pending blockchain integrated station, and the blockchain nodes in the blockchain network store the description information of blockchain integrated stations already allowed to join the blockchain network. In this case, it can be determined whether the second description information included in the to-be-verified digital certificate belongs to the description information of the blockchain integrated stations already allowed to join the blockchain network. When it is determined that the second description information included in the to-be-verified digital certificate belongs to the description information of the blockchain integrated stations already allowed to join the blockchain network (at this time, verification for the to-be-verified digital certificate is successful), the blockchain integrated station corresponding to the to-be-verified digital certificate is determined as a blockchain node in the blockchain network.

For convenience of understanding, the process in which a pending blockchain integrated station applies to join a target blockchain network will be described in detail below in combination with the specific embodiments and FIG. 4.

Figure 4:
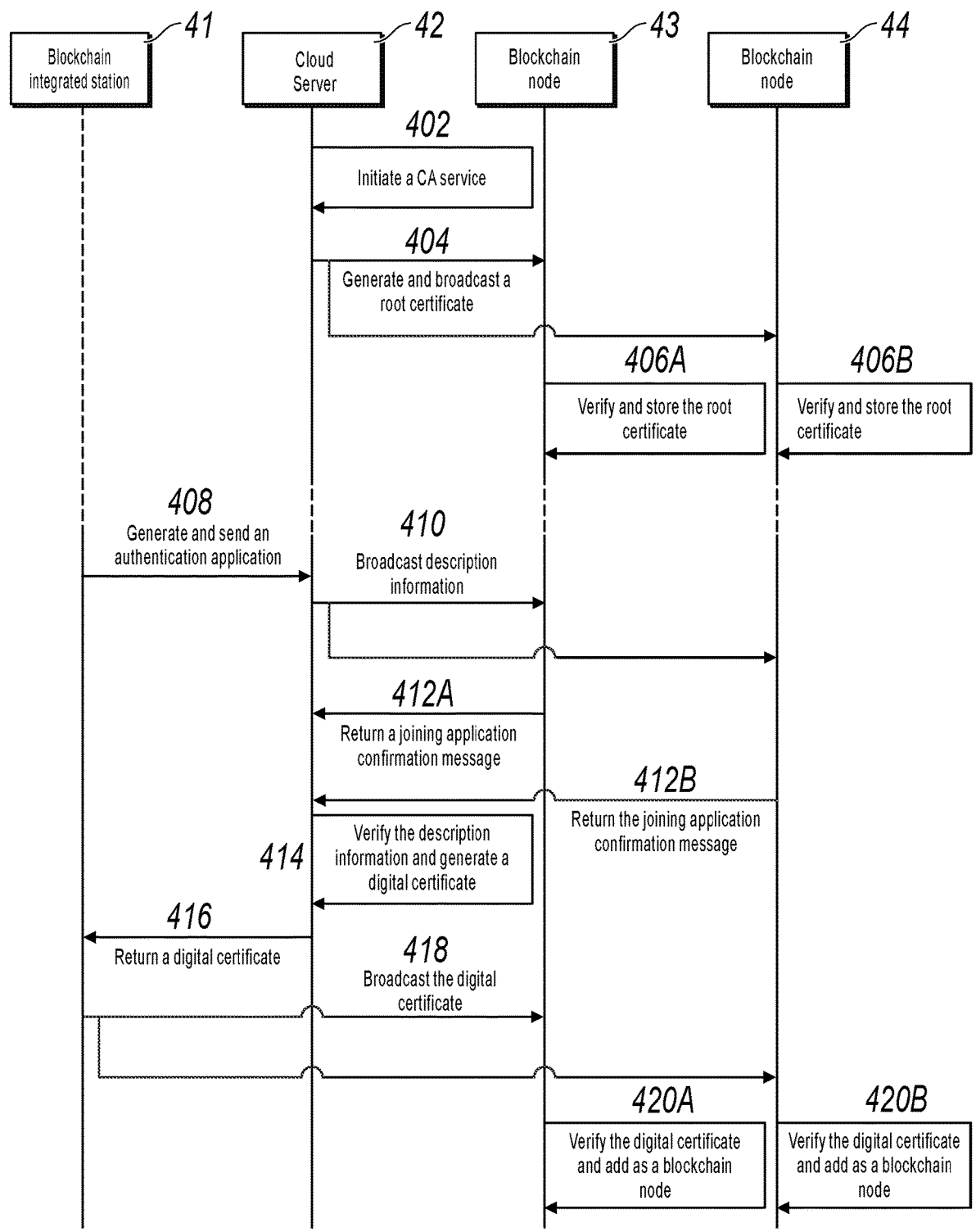
FIG. 4 is an interaction diagram in which a pending blockchain integrated station applies to join a target blockchain network, according to example embodiments of the present specification.

FIG. 4 is an interaction diagram in which a pending blockchain integrated station applies to join a target blockchain network according to example embodiments of the present specification. As shown in FIG. 4, the interaction process can include the following steps.

At step 402, a cloud server 42 initiates a CA service.

At step 404, the cloud server 42 generates and broadcasts a root certificate.

The cloud server 42 can generate an identity key, for example, a first identity key. The first identity key can include a first identity private key and a first identity public key. Next, the cloud server 42 generates the root certificate based on the CA service. Specifically, the CA service can generate a digital certificate corresponding to the cloud server 42, i.e. the previously describe root certificate, by signing the first identity public key and description information of the cloud server 42 using the first identity private key. After generating the root certificate, the cloud server 42 can broadcast the root certificate to the target blockchain network, so that each blockchain node in the target blockchain network stores the root certificate. The description information of the cloud server 42 can include ID information, product serial number, IP address, and MAC address and the like, which are not limited by the present specification.

The following descriptions are made with a blockchain node 43 and a blockchain node 44 in the target blockchain network as an example.

At step 406A, the blockchain node 43 verifies and stores the root certificate.

At step 406B, the blockchain node 44 verifies and stores the root certificate.

The blockchain node 43 and the blockchain node 44 can perform signature verification using the first identity public key included in the root certificate, and determine the root certificate passes verification in a case of successful signature verification, thereby storing the root certificate.

At step 408, the blockchain integrated station 41 generates and sends an authentication application to the cloud server 42.

As a pending blockchain integrated station, the blockchain integrated station 41 requests the CA service on the cloud server 42 to issue a digital certificate for the blockchain integrated station 41 by generating and sending the authentication application. Similar to the cloud server 42, the blockchain integrated station 41 can generate an identity key, for example, a second identity key, and the second identity key can include a second identity private key and a second identity public key. The authentication application generated by the blockchain integrated station 41 can include the second identity public key and description information of the blockchain integrated station 41. The description information of blockchain integrated station can include ID information, product serial number, IP address, MAC address and the like, as long as such information can prove the identity of the blockchain integrated station. The description information is not limited by the present specification.

At step 410, the cloud server 42 broadcasts the description information of the blockchain integrated station 41.

At step 412A, the blockchain node 43 returns a joining application confirmation message to the cloud server 42.

At step 412B, the blockchain node 44 returns a joining application confirmation message to the cloud server 42.

The blockchain nodes in the current blockchain network can also be allowed to join the process of determining whether to allow the pending blockchain integrated station in the blockchain network. Therefore, the cloud server 42 can send the description information of the blockchain integrated station 41 to the target blockchain network so that the blockchain nodes in the target blockchain network determine whether to allow the blockchain integrated station 41 to join the target blockchain network according to the description information. In a case of determining as allowed, the blockchain nodes return corresponding joining application confirmation messages to the cloud server 42 to notify the cloud server 42 of the fact that the target blockchain network agrees to allow the blockchain integrated station 41 to join. At the same time, the blockchain nodes in the target blockchain network store the description information of the blockchain integrated station 41 so that the description information is used to verify the digital certificate provided by the blockchain integrated station 41 when the blockchain integrated station 41 joins the target blockchain network subsequently. For example, the blockchain node can maintain a node information list to record the description information of the blockchain integrated stations allowed to join the target blockchain network. For example, the node information list records IP addresses of blockchain integrated stations allowed to join the target blockchain network, which is not limited by the present specification.

In one case, the operation of determining whether to allow the blockchain integrated station 41 to join the target blockchain network can be performed by a master node in the target blockchain network. For example, the blockchain nodes in the target blockchain network can determine one or more master nodes by election. The election rule adopted is not limited by the present specification, for example, the first n blockchain nodes accessing the network are determined as master nodes according to a network access sequence, for another example, n blockchain nodes are selected as master nodes in a descending order or ascending order according to the sizes of IP addresses, where n is a positive integer.

In another case, whether to allow the blockchain integrated station 41 to join the target blockchain network can be determined by all nodes having accounting authority in the target blockchain network. With a consortium blockchain as an example, whether to allow the blockchain integrated station 41 to join the target blockchain network can be determined jointly by all consortium members. For example, only when the consortium members satisfying a predetermined ratio allow the blockchain integrated station 41 to join the target blockchain network, can the cloud server determine that the target blockchain network allows the blockchain integrated station 41 to join the target blockchain network. Of course, the specific value of the predetermined ratio can be set according to actual situations, which will not be limited by the present specification.

At step 414, the cloud server 42 verifies the description information and generates a digital certificate.

Before the cloud server 42 generates the digital certificate of the blockchain integrated station 41, the cloud server 42 can verify the description information of the blockchain integrated station 41 through the CA service, so as to generate the digital certificate in a case of successful verification. That is, whether to allow the blockchain integrated station 41 to join the blockchain network is determined by verifying the description information of the blockchain integrated station 41. In a case of unsuccessful verification, it indicates that the blockchain integrated station 41 failed to be authenticated and the operation of generating the digital certificate for the blockchain integrated station 41 is not performed.

Specifically, the CA service can sign the second identity public key and the description information of the blockchain integrated station 41 and the description information of the cloud server 42 through the first identity private key to generate a digital certificate corresponding to the blockchain integrated station 41. Herein, the description information of the cloud server 42 adopted for signature can be inconsistent with the description information of the blockchain integrated station 41, for example, different types of description information can be included, which depends on a rule set by the CA service. Likewise, the description information of the blockchain integrated station 41 included in the authentication application can be inconsistent with the description information of the blockchain integrated station 41 adopted for signature, for example, the description information adopted for signature can be only part of the description information included in the authentication application, and especially can exclude part of description information that is not suitable for disclosure (for example, information relating to privacy). For another example, the description information adopted for signature can be a hash value of the description information included in the authentication application. Thus, the digital certificate can fully correspond to the description information included in the authentication application, and be prevented from disclosing the description information unsuitable for disclosure.

It should be noted that the specific manner in which the target blockchain network and the cloud server 42 determine whether to allow the blockchain integrated station 41 to join the target blockchain network according to the description information can be flexibly determined according to actual situations, and will not be limited by the present specification. For example, whether to allow the blockchain integrated station 41 to join the target blockchain network can be determined based on a blacklist which records description information of blockchain integrated stations disallowed to join the target blockchain network.

At step 416, the cloud server 42 returns the digital certificate to the blockchain integrated station 41.

At step 418, the blockchain integrated station 41 broadcasts the digital certificate to the target blockchain network.

At step 420A, the blockchain node 43 verifies the digital certificate and adds the blockchain integrated station 41 as a blockchain node.

At step 420B, the blockchain node 44 verifies the digital certificate and adds the blockchain integrated station 41 as a blockchain node.

Descriptions will be made with the blockchain integrated station 43 as an example, to which the blockchain integrated station 44 is similar. After receiving the digital certificate broadcast by the blockchain integrated station 41, the blockchain node 43 takes the digital certificate as a to-be-verified digital certificate, and performs signature verification for the to-be-verified digital certificate according to the first identity public key included in the root certificate of the cloud server 42, so as to determine the to-be-verified digital certificate is issued by the CA service started on the cloud server in a case of successful signature verification. Further, the to-be-verified digital certificate includes the description information of the blockchain integrated station 41, and the node information list of the blockchain integrated station 43 records the description information of blockchain integrated stations already allowed to join the blockchain network. In this case, whether the description information included in the to-be-verified digital certificate is recorded in the node information list is determined by querying the node information list. When it is determined that the description information included in the to-be-verified digital certificate is recorded in the node information list (at this time, verification for the to-be-verified digital certificate is successful), the blockchain integrated station (i.e. the blockchain integrated station 41) corresponding to the to-be-verified digital certificate is determined as a blockchain node in the blockchain network.

Corresponding to the embodiments of the blockchain integrated station side, the present specification further provides an embodiment of cloud server side. The descriptions involved in the embodiments of the blockchain integrated station side are also applicable to the embodiments of cloud server side and thus will not be repeated in the present specification.

Figure 5:
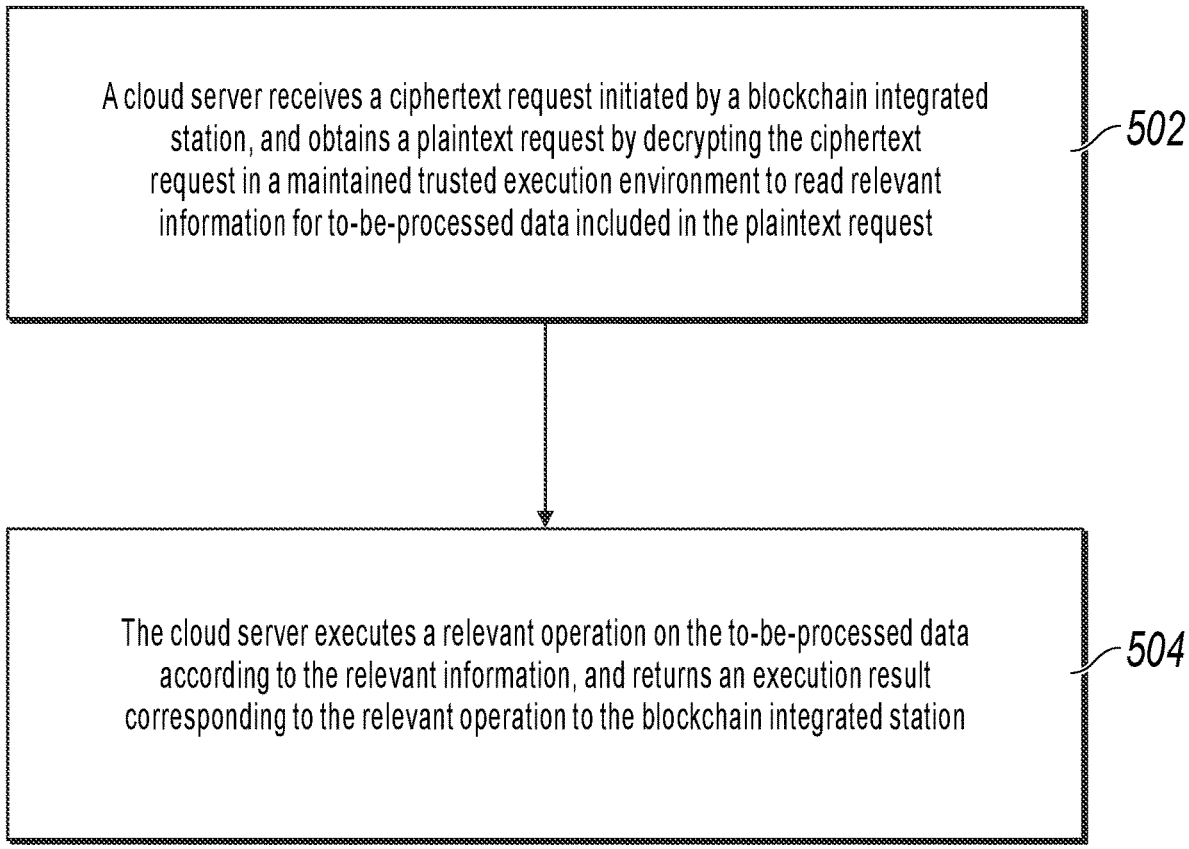
FIG. 5 is a flowchart of a blockchain data processing method based on cloud computing at cloud server side, according to example embodiments of the present specification.

Correspondingly, FIG. 5 is a flowchart of a blockchain data processing method based on cloud computing at cloud server side according to example embodiments of the present specification. As shown in FIG. 5, the method can include the following steps.

At step 502, a cloud server receives a ciphertext request initiated by a blockchain integrated station, and obtains a plaintext request by decrypting the ciphertext request in a maintained trusted execution environment to read relevant information for to-be-processed data included in the plaintext request.

At step 504, the cloud server executes a relevant operation on the to-be-processed data according to the relevant information, and returns an execution result corresponding to the relevant operation to the blockchain integrated station.

As mentioned above, an off-chain contract is pre-deployed on the cloud server, and the relevant information includes the to-be-processed data and a contract address of the off-chain contract for processing the to-be-processed data. In this case, the cloud server can firstly determine the off-chain contract deployed on the cloud server according to the contract address, and read the to-be-processed data and the off-chain contract into the trusted execution environment, and then execute the off-chain contract through an execution engine deployed in the trusted execution environment, so as to compute the to-be-processed data.

As mentioned above, the cloud server provides a remote certificate report for the trusted execution environment to the blockchain integrated station, where the remote certificate report is generated by an authentication server verifying self-recommendation information generated by the cloud server for the trusted execution environment; the cloud server provides to-be-verified contract information of the off-chain contract to the blockchain integrated station, where the to-be-verified contract information is signed by the cloud server using its own identity private key in the trusted execution environment, and the identity private key is maintained by the cloud server in the trusted execution environment.

In a case of determining the trusted execution environment is trustworthy according to the remote certificate report, the blockchain integrated station performs signature verification for the to-be-verified contract information using an identity public key of the cloud server, performs contract information verification for the to-be-verified contract information according to contract information of the off-chain contract, and determines the off-chain contract is trustworthy in a case that both the signature verification and the contract information verification are passed.

As mentioned above, the to-be-processed data is stored in another blockchain network different from a blockchain network where the blockchain integrated station is located, and the relevant information includes address information of the to-be-processed data. In this case, the cloud server performs cross-chain access to the to-be-processed data stored in the other blockchain network according to the address information.

As mentioned above, the cloud server generates a root certificate by signing a first identity public key and first description information of the cloud server using a first identity private key of the cloud server.

The to-be-processed data includes a second identity public key of the blockchain integrated station, and the relevant information includes second description information of the blockchain integrated station. In this case, the cloud server generates a digital certificate corresponding to the blockchain integrated station by signing the second identity public key, the first description information and second description information of the blockchain integrated station using the first identity private key; wherein a digital certificate of any blockchain integrated station is successfully verified by any blockchain node in a target blockchain network using the root certificate, and determined by the any blockchain node as a precondition for allowing the any pending blockchain integrated station in the target blockchain network.

As mentioned above, the cloud server can verify the second description information so as to generate the digital certificate in a case of successful verification.

As mentioned above, the cloud server can send the second description information of the blockchain integrated station to the target blockchain network, so as to generate the digital certificate in a case of obtaining a joining application confirmation message for the blockchain integrated station generated by the target blockchain network based on the second description information.

As mentioned above, the second description information is used to verify the digital certificate of the blockchain integrated station.

As mentioned above, the cloud server can obtain a ciphertext request initiated by the blockchain integrated station through an oracle mechanism. Specifically, the cloud server receives the ciphertext request sent and obtained by an oracle server from an event monitored from an oracle contract, and the event is generated by the blockchain integrated station calling the oracle contract. Similarly, the cloud server returns the execution result to the oracle server which transmits the execution result to the oracle contract.

Figure 6:
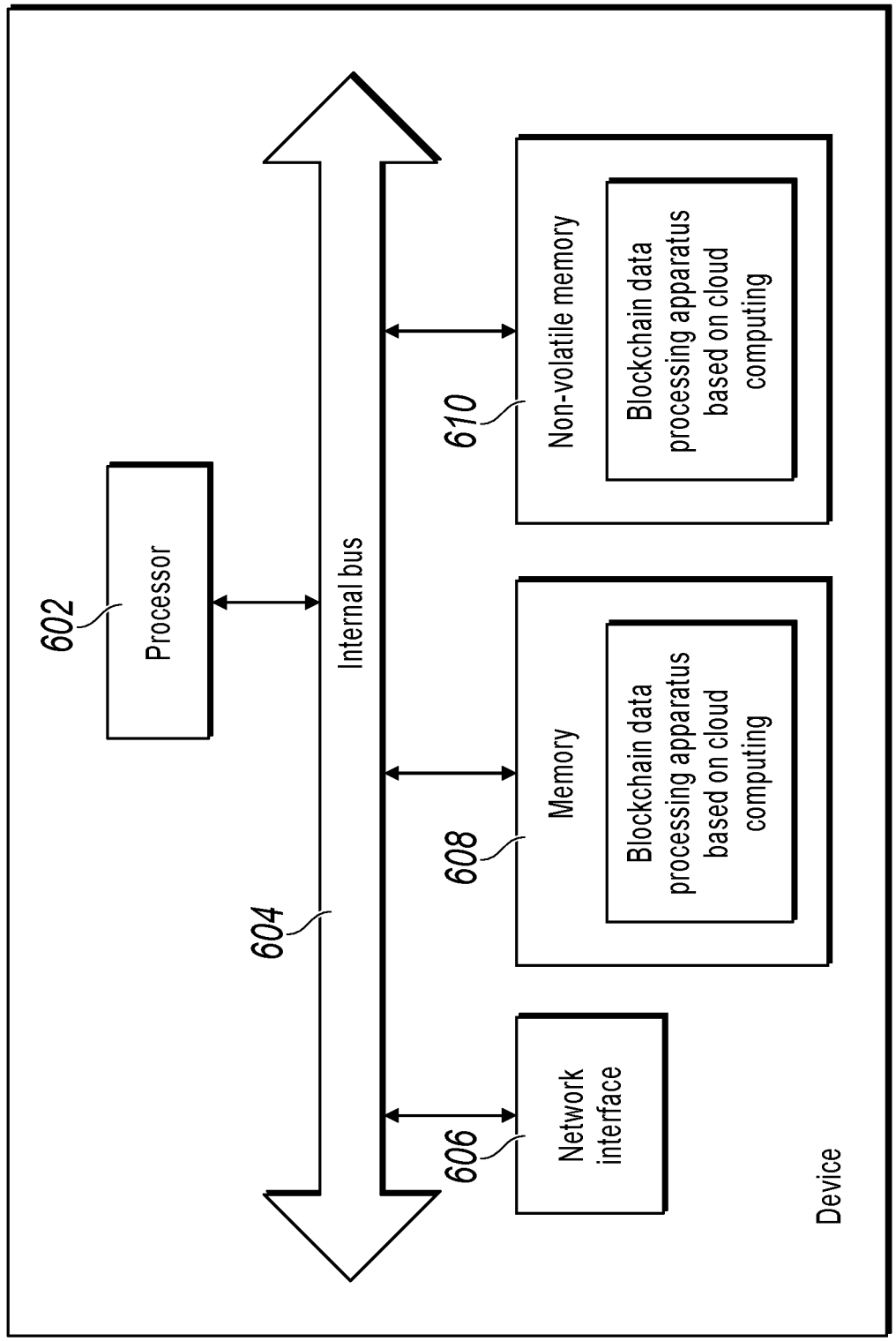
FIG. 6 is a structural schematic diagram of a device, according to example embodiments of the present specification.

FIG. 6 is a structural schematic diagram of a device according to example embodiments of the present specification. As shown in FIG. 6, from the hardware level, the device includes a processor 602, an internal bus 604, a network interface 606, a memory 608, and a non-volatile memory 610. Of course, the device can further include hardware required for other services. The processor 602 reads corresponding computer programs from the non-volatile memory 610 to the memory 608 for running, so as to logically form a blockchain data processing apparatus based on cloud computing. Of course, in addition to the software implementation, one or more embodiments of the present specification do not exclude other implementations, for example, logic device or a combination of software and hardware or the like. That is, the executing subject of the following processing flow is not limited to each logic unit and can also be hardware or logic device.

Figure 7:
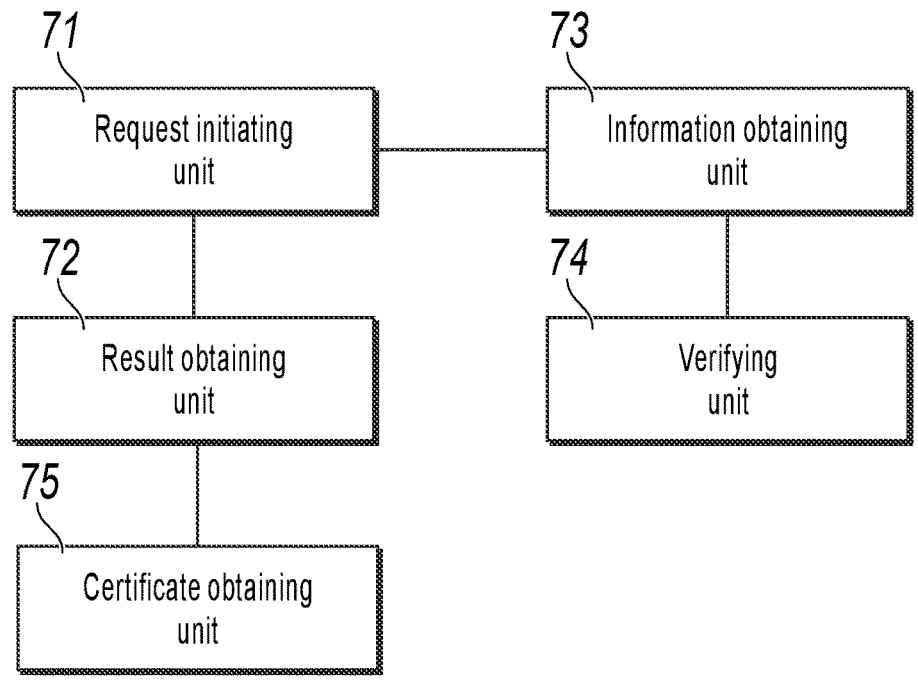
FIG. 7 is a block diagram of a blockchain data processing apparatus based on cloud computing, according to example embodiments of the present specification.

As shown in FIG. 7, in a software implementation, the blockchain data processing apparatus based on cloud computing can include:

a request initiating unit 71, configured to enable a blockchain integrated station to initiate a ciphertext request to a cloud server, where a plaintext request is obtained by the cloud server decrypting the ciphertext request in a maintained trusted execution environment, and the plaintext request includes relevant information for to-be-processed data;

a result obtaining unit 72, configured to enable the blockchain integrated station to obtain an execution result returned by the cloud server, where the execution result is obtained by the cloud server executing a relevant operation on the to-be-processed data according to the relevant information.

Optionally, an off-chain contract is pre-deployed on the cloud server, the relevant information includes the to-be-processed data and a contract address of the off-chain contract for processing the to-be-processed data; the execution result is obtained by the cloud server executing the off-chain contract corresponding to the contract address through an execution engine deployed in the trusted execution environment to compute the to-be-processed data.

Optionally, the apparatus further includes:

an information obtaining unit 73, configured to enable the blockchain integrated station to obtain a remote certificate report for the trusted execution environment, where the remote certificate report is generated by an authentication server verifying self-recommendation information generated by the cloud server for the trusted execution environment; and enable the blockchain integrated station to obtain to-be-verified contract information of the off-chain contract, where the to-be-verified contract information is signed by the cloud server using its own identity private key in the trusted execution environment, and the identity private key is maintained by the cloud server in the trusted execution environment;

a verifying unit 74, configured to enable the blockchain integrated station to, in a case of determining the trusted execution environment is trustworthy according to the remote certificate report, perform signature verification for the to-be-verified contract information using an identity public key of the cloud server, perform contract information verification for the to-be-verified contract information according to contract information of the off-chain contract, and determine the off-chain contract is trustworthy in a case that both the signature verification and the contract information verification are passed.

Optionally, the to-be-processed data is stored in another blockchain network different from a blockchain network where the blockchain integrated station is located, the relevant information includes address information of the to-beprocessed data, and the to-be-processed data is obtained by the cloud server performing cross-chain access to the other blockchain network according to the address information.

Optionally, the to-be-processed data includes a second identity public key of the blockchain integrated station, and the relevant information includes second description information of the blockchain integrated station; the apparatus further includes:

a certificate obtaining unit 75, configured to enable the blockchain integrated station to obtain a digital certificate corresponding to the blockchain integrated station and obtained by the cloud server signing the second identity public key, first description information of the cloud server, and the second description by using a first identity private key of the cloud server;

wherein a digital certificate of any blockchain integrated station is successfully verified by any blockchain node in a target blockchain network using a root certificate, and determined by the any blockchain node as a precondition for the any pending blockchain integrated station in the target blockchain network; the root certificate is obtained by the cloud server signing first identity public key of the cloud server and the first description information of the cloud server using the first identity private key of the cloud server.

Optionally, a precondition for the cloud server to generate the digital certificate includes successfully verifying the second description information by the cloud server.

Optionally, the precondition for the cloud server to generate the digital certificate includes: generating a joining application confirmation message for the blockchain integrated station generated by the target blockchain network based on the second description information sent by the cloud server.

Optionally, the second description information is used to verify the digital certificate of the blockchain integrated station.

Optionally, the request initiating unit 71 is specifically configured to enable the blockchain integrated station to generate an event including the ciphertext request by calling an oracle contract, where in a case that the event is monitored by an oracle server, the oracle server obtains and sends the ciphertext request included in the event to the cloud server.

The result obtaining unit 72 is specifically configured to obtain an execution result returned by the oracle server to the oracle contract, where the execution result is returned by the cloud server to the oracle server.

Figure 8:
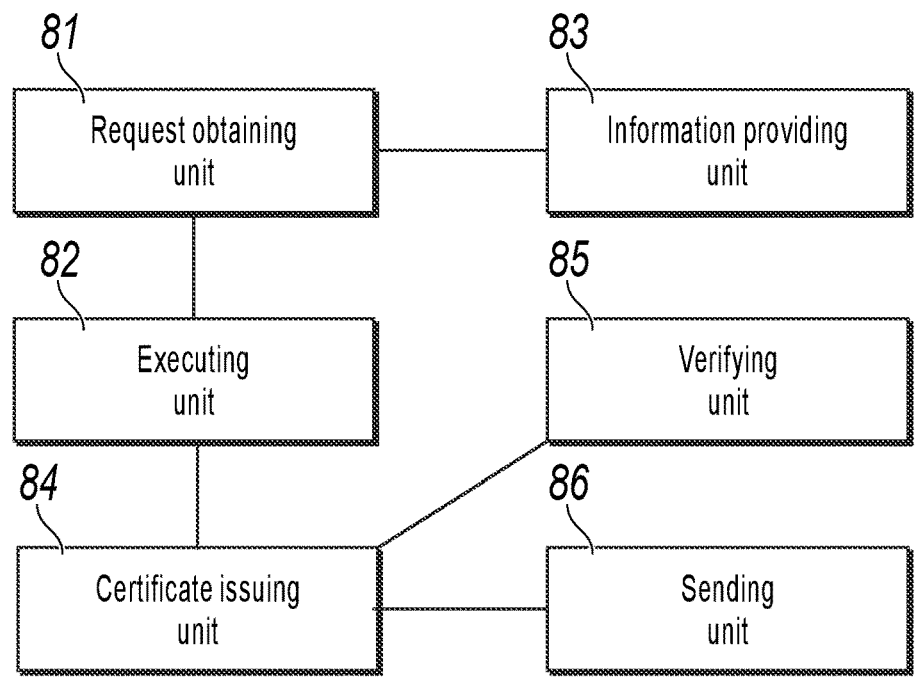
FIG. 8 is a block diagram of another blockchain data processing apparatus based on cloud computing, according to example embodiments of the present specification.

As shown in FIG. 8, in another software implementation, the blockchain data processing apparatus based on cloud computing can include:

a request obtaining unit 81, configured to enable a cloud server to receive a ciphertext request initiated by a blockchain integrated station, and obtain a plaintext request by decrypting the ciphertext request in a maintained trusted execution environment to read relevant information for to-be-processed data included in the plaintext request;

an executing unit 82, configured to enable the cloud server to execute a relevant operation on the to-be-processed data according to the relevant information, and return an execution result corresponding to the relevant operation to the blockchain integrated station.

Optionally, an off-chain contract is pre-deployed on the cloud server, the relevant information includes the to-be-processed data and a contract address of the off-chain contract for processing the to-be-processed data; the executing unit 82 is specifically configured to:

determine, by the cloud server, the off-chain contract deployed on the cloud server according to the contract address, and read the to-be-processed data and the off-chain contract into the trusted execution environment;

execute, by the cloud server, the off-chain contract through an execution engine deployed in the trusted execution environment to compute the to-be-processed data.

Optionally, the apparatus further includes:

an information providing unit 83, configured to enable the cloud server to provide a remote certificate report for the trusted execution environment to the blockchain integrated station, where the remote certificate report is generated by an authentication server verifying self-recommendation information generated by the cloud server for the trusted execution environment; and enable the cloud server to provide to-be-verified contract information of the off-chain contract to the blockchain integrated station, where the to-be-verified contract information is signed by the cloud server using its own identity private key in the trusted execution environment, and the identity private key is maintained by the cloud server in the trusted execution environment;

wherein in a case of determining the trusted execution environment is trustworthy according to the remote certificate report, the blockchain integrated station performs signature verification for the to-be-verified contract information using an identity public key of the cloud server, performs contract information verification for the to-be-verified contract information according to contract information of the off-chain contract, and determines the off-chain contract is trustworthy in a case that both the signature verification and the contract information verification are passed.

Optionally, the to-be-processed data is stored in another blockchain network different from a blockchain network where the blockchain integrated station is located, and the relevant information includes address information of the to-be-processed data; the executing unit 82 is specifically configured to:

perform, by the cloud server, cross-chain access to the to-be-processed data stored in the other blockchain network according to the address information.

Optionally, the apparatus further includes a certificate issuing unit 84, configured to enable the cloud server to generate a root certificate by signing a first identity public key and first description information of the cloud server using a first identity private key of the cloud server;

wherein the to-be-processed data includes a second identity public key of the blockchain integrated station, and the relevant information includes second description information of the blockchain integrated station; the executing unit 82 is specifically configured to enable the cloud server to generate a digital certificate corresponding to the blockchain integrated station by signing the second identity public key, the first description information and second description information of the blockchain integrated station using the first identity private key; wherein a digital certificate of any blockchain integrated station is successfully verified by any blockchain node in a target blockchain network using the root certificate, and determined by the any blockchain node as a precondition for the any pending blockchain integrated station in the target blockchain network.

Optionally, the apparatus further includes:

a verifying unit 85, configured to enable the cloud server to verify the second description information, so as to generate the digital certificate in a case of successful verification.

Optionally, the apparatus further includes:

a sending unit 86, configured to enable the cloud server to send the second description information of the blockchain integrated station to the target blockchain network, so as to generate the digital certificate in a case of obtaining a joining application confirmation message for the blockchain integrated station generated by the target blockchain network according to the second description information.

Optionally, the second description information is used to verify the digital certificate of the blockchain integrated station.

Optionally, the request obtaining unit 81 is specifically configured to enable the cloud server to receive a ciphertext request sent and obtained by an oracle server from an event monitored from an oracle contract, and the event is generated by the blockchain integrated station calling the oracle contract.

The executing unit 82 is specifically configured to enable the cloud server to return an execution result to the oracle server, where the execution result is transmitted from the oracle server to the oracle contract.

The systems, apparatuses, modules or units described in the embodiments can be specifically implemented by a computer chip or an entity or can be implemented by a product with a particular function. A typical implementing device can be a computer and the computer can be specifically a personal computer, a laptop computer, a cellular phone, a camera phone, a smart phone, a personal digital assistant, a media player, a navigation device, an email transceiver, a game console, a tablet computer, a wearable device, or a combination of any several devices of the devices.

In a typical configuration, the computer can include one or more central processing units (CPU), one or more input/output interfaces, one or more network interfaces, and one or more memories.

The memory can include a non-permanent memory, a random access memory (RAM), and/or a non-volatile memory and the like in a computer readable medium, for example, read only memory (ROM), or flash RAM. The memory is one example of the computer readable medium.

The computer readable medium includes permanent, non-permanent, portable and non-portable media, which can realize information storage by any method or technology. The information can be computer readable instructions, data structures, program modules and other data. The examples of the computer storage medium include but not limited to: a phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technology, CD-ROM, digital versatile disc (DVD) or other optical storage, cassette type magnetic tape, magnetic disk storage, quantum memory, storage medium based on graphene, or other magnetic storage device or other non-transmission medium for storing information accessible by computing devices. According to the definition of the specification, the computer readable medium does not include transitory computer readable media, for example, modulated data signal and carriers.

It should be noted that the term "including", "containing" or any variation thereof is intended to encompass non-exclusive inclusion, so that a process, method, product, or device including a series of elements includes not only those elements but also other elements not listed explicitly or those elements inherent to such a process, method, product, or device. Without more limitations, an element defined by the statement "including a . . . " shall not be excluded to include additional same elements in a process, method, product, or device including the elements.

The specific embodiments are described as above. Other embodiments can also be obtained within the scope of the appended claims. In some cases, the actions or steps recorded in the claims can be performed in a sequence different from the embodiments to achieve the desired result. Further, the processes shown in drawings do not necessarily require a particular sequence or a continuous sequence shown to achieve the desired result. In some embodiments, multi-task processing and parallel processing are possible and can also be advantageous.

The terms used in one or more embodiments of the present specification are for the purpose of describing particular embodiments only, and are not intended to limit the one or more embodiments of the present specification. Terms "a", "the" and "said" used in their singular forms in one or more embodiments of the present specification and the appended claims are also intended to include plurality, unless clearly indicated otherwise in the context. It should also be understood that the term "and/or" as used in the present specification refers to and includes any and all possible combinations of one or more of the associated listed items.

It is to be understood that, although the terms "first," "second," "third," and the like can be used in one or more embodiments of the present specification to describe various information, such information should not be limited to these terms. These terms are only used to distinguish one category of information from the other. For example, without departing from the scope of one or more embodiments of the present specification, first information can be referred as second information; and similarly, the second information can also be referred as the first information. Depending on the context, the term "if" as used in the present specification can be interpreted as "when" or "upon" or "in response to determining".

The previously described is merely illustrative of preferred embodiments of one or more embodiments of the present specification, but not intended to limit the present specification, and any modifications, equivalent substitutions, adaptations thereof made within the spirit and principles of the specification shall be encompassed in the scope of protection of the present specification.

What is claimed is:

1. A blockchain integrated station comprising:
   a cryptographic acceleration card, wherein the cryptographic acceleration card is capable of performing key management, encryption and decryption, and signature verification for the blockchain integrated station;
   at least one processor; and
   one or more memories coupled to the at least one processor and storing programming instructions for execution by the at least one processor, wherein the programming instructions when executed cause the blockchain integrated station to perform one or more operations comprising:
      generating an authentication application, wherein the blockchain integrated station is applying to join a blockchain network, wherein the blockchain network is connected to a server;
      sending the authentication application to the server, wherein the authentication application requests a certificate authority (CA) service of the server to issue a digital certificate for the blockchain integrated station, wherein the authentication application comprises an identity public key and description information of the blockchain integrated station;

obtaining the digital certificate of the blockchain integrated station, wherein the digital certificate is obtained based on an identity private key of the server, the identity public key of the blockchain integrated station, description information of the server, and the description information of the blockchain integrated station, wherein a precondition under which the server generates the digital certificate for the blockchain integrated station includes: the blockchain network generates a joining application confirmation message for the blockchain integrated station based on the description information of the blockchain integrated station;

in response to obtaining the digital certificate, broadcasting the digital certificate to one or more blockchain nodes of the blockchain network to add the blockchain integrated station as a blockchain node;

after joining the blockchain network as the blockchain node based on the digital certificate, obtaining the identity public key of the server and maintaining the identity public key of the server in the cryptographic acceleration card;

obtaining to-be-verified contract information of an off-chain contract;

performing, by the cryptographic acceleration card, a signature verification on the to-be-verified contract information using the identity public key of the server maintained in the cryptographic acceleration card;

after the signature verification on the to-be-verified contract information is passed, transmitting a ciphertext request to the server, wherein the ciphertext request comprises first information associated with input data of the off-chain contract; and receiving, from the server, an execution result, wherein the execution result is obtained by the server by executing the off-chain contract using the input data.

2. The blockchain integrated station of claim 1, wherein the off-chain contract is stored in the server, wherein the first information comprises the input data and a contract address of the off-chain contract, and wherein the execution result is obtained by the server by executing the off-chain contract corresponding to the contract address to compute the input data based on an execution engine deployed in a trusted execution environment.

3. The blockchain integrated station of claim 1, the operations comprising:

obtaining a remote certificate report for a trusted execution environment, wherein the remote certificate report is generated by an authentication server by verifying self-recommendation information generated by the server for the trusted execution environment; and in response to determining that the trusted execution environment is trustworthy based on the remote certificate report:

performing a contract information verification on the to-be-verified contract information based on contract information of the off-chain contract, wherein the to-be-verified contract information is signed by the server in the trusted execution environment using the identity private key of the server, and wherein the identity private key of the server is stored in the trusted execution environment; and in response to determining that the signature verification and the contract information verification are passed, determining that the off-chain contract is trustworthy.

4. The blockchain integrated station of claim 1, wherein the blockchain network is a first blockchain network, wherein the input data is stored in a second blockchain network different from the first blockchain network, wherein the first information comprises address information of the input data, and wherein the input data is obtained by the server by performing a cross-chain access to the second blockchain network based on the address information.

5. The blockchain integrated station of claim 1, wherein the input data comprises the identity public key of the blockchain integrated station, and wherein the first information comprises the description information of the blockchain integrated station, wherein the digital certificate of the blockchain integrated station is verified, by the one or more blockchain nodes in the blockchain network, using a root certificate, wherein verifying the digital certificate of the blockchain integrated station is a precondition for the blockchain integrated station to join the blockchain network, wherein the root certificate is obtained, by the server, by using the identity private key of the server to sign the identity public key of the server and the description information of the server.

6. The blockchain integrated station of claim 1, wherein:

transmitting the ciphertext request comprises generating, by calling an oracle contract, an event comprising the ciphertext request, wherein the ciphertext request comprised in the event is sent by an oracle server to the server in response to a determination that the event is monitored by the oracle server; and receiving the execution result comprises obtaining the execution result returned by the oracle server to the oracle contract, wherein the execution result is returned by the server to the oracle server.

7. The blockchain integrated station of claim 1, wherein the blockchain integrated station further comprises at least one of an intelligent network card or a smart contract processing chip, and wherein the blockchain integrated station comprises at least one of a certificate authority service, a standardized on-cloud service interface, or a standardized cross-chain service interface.

8. The blockchain integrated station of claim 1, wherein a plaintext request is obtained by the server by decrypting the ciphertext request in a trusted execution environment, and wherein the plaintext request comprises the first information.

9. The blockchain integrated station of claim 1, wherein the to-be-verified contract information of the off-chain contract includes name, description, version number, bytecode hash value, and contract identity public key of the off-chain contract.

10. A computer-implemented method comprising:

generating, by a blockchain integrated station applying to join a blockchain network, an authentication application, wherein the blockchain network is connected to a server;

sending, by the blockchain integrated station, the authentication application to the server, wherein the authentication application requests a certificate authority (CA) service of the server to issue a digital certificate for the blockchain integrated station, wherein the authentication application comprises an identity public key and description information of the blockchain integrated station;

obtaining, by the blockchain integrated station, the digital certificate of the blockchain integrated station, wherein the digital certificate is obtained based on an identity private key of the server, the identity public key of the blockchain integrated station, description information of the server, and the description information of the blockchain integrated station, wherein a precondition under which the server generates the digital certificate for the blockchain integrated station includes: the blockchain network generates a joining application confirmation message for the blockchain integrated station based on the description information of the blockchain integrated station;

in response to obtaining the digital certificate, broadcasting, by the blockchain integrated station, the digital certificate to one or more blockchain nodes of the blockchain network to add the blockchain integrated station as a blockchain node;

after joining the blockchain network as the blockchain node based on the digital certificate, obtaining, by the blockchain integrated station, the identity public key of the server and maintaining the identity public key of the server in a cryptographic acceleration card of the blockchain integrated station, wherein the cryptographic acceleration card is capable of performing key management, encryption and decryption, and signature verification for the blockchain integrated station;

obtaining, by the blockchain integrated station, to-be-verified contract information of an off-chain contract;

performing, by the cryptographic acceleration card of the blockchain integrated station, a signature verification on the to-be-verified contract information using the identity public key of the server maintained in the cryptographic acceleration card;

after the signature verification on the to-be-verified contract information is passed, transmitting, by the blockchain integrated station, a ciphertext request to the server, wherein the ciphertext request comprises first information associated with input data of the off-chain contract; and receiving, by the blockchain integrated station and from the server, an execution result, wherein the execution result is obtained by the server by executing the off-chain contract using the input data.

11. The computer-implemented method of claim 10, wherein the off-chain contract is stored in the server, wherein the first information comprises the input data and a contract address of the off-chain contract, and wherein the execution result is obtained by the server by executing the off-chain contract corresponding to the contract address to compute the input data based on an execution engine deployed in a trusted execution environment.

12. The computer-implemented method of claim 10, comprising:

obtaining, by the blockchain integrated station, a remote certificate report for a trusted execution environment, wherein the remote certificate report is generated by an authentication server by verifying self-recommendation information generated by the server for the trusted execution environment; and in response to determining that the trusted execution environment is trustworthy based on the remote certificate report:

performing, by the blockchain integrated station, a contract information verification on the to-be-verified contract information based on contract information of the off-chain contract, wherein the to-be-verified contract information is signed by the server in the trusted execution environment using the identity private key of the server, and wherein the identity private key of the server is stored in the trusted execution environment; and in response to determining that the signature verification and the contract information verification are passed, determining, by the blockchain integrated station, that the off-chain contract is trustworthy.

13. The computer-implemented method of claim 10, wherein the blockchain network is a first blockchain network, wherein the input data is stored in a second blockchain network different from the first blockchain network, wherein the first information comprises address information of the input data, and wherein the input data is obtained by the server by performing a cross-chain access to the second blockchain network based on the address information.

14. The computer-implemented method of claim 10, wherein the input data comprises the identity public key of the blockchain integrated station, and wherein the first information comprises the description information of the blockchain integrated station, wherein the digital certificate of the blockchain integrated station is verified, by the one or more blockchain nodes in the blockchain network, using a root certificate, wherein verifying the digital certificate of the blockchain integrated station is a precondition for the blockchain integrated station to join the blockchain network, wherein the root certificate is obtained, by the server, by using the identity private key of the server to sign the identity public key of the server and the description information of the server.

15. The computer-implemented method of claim 10, wherein:

transmitting the ciphertext request comprises generating, by the blockchain integrated station and by calling an oracle contract, an event comprising the ciphertext request, wherein the ciphertext request comprised in the event is sent by an oracle server to the server in response to a determination that the event is monitored by the oracle server; and receiving the execution result comprises obtaining the execution result returned by the oracle server to the oracle contract, wherein the execution result is returned by the server to the oracle server.

16. The computer-implemented method of claim 10, wherein the blockchain integrated station further comprises at least one of an intelligent network card or a smart contract processing chip, and wherein the blockchain integrated station comprises at least one of a certificate authority service, a standardized on-cloud service interface, or a standardized cross-chain service interface.

17. The computer-implemented method of claim 10, wherein a plaintext request is obtained by the server by decrypting the ciphertext request in a trusted execution environment, and wherein the plaintext request comprises the first information.

18. A computer-implemented system comprising:

one or more blockchain integrated stations; and one or more computer memory devices coupled with the one or more blockchain integrated stations and having tangible, non-transitory, machine-readable media storing one or more instructions that, when executed by the one or more blockchain integrated stations, perform one or more operations comprising:

generating, by a blockchain integrated station applying to join a blockchain network, an authentication application, wherein the blockchain network is connected to a server;

sending, by the blockchain integrated station, the authentication application to the server, wherein the authentication application requests a certificate authority (CA) service of the server to issue a digital certificate for the blockchain integrated station, wherein the authentication application comprises an identity public key and description information of the blockchain integrated station;

obtaining, by the blockchain integrated station, the digital certificate of the blockchain integrated station, wherein the digital certificate is obtained based on an identity private key of the server, the identity public key of the blockchain integrated station, description information of the server, and the description information of the blockchain integrated station, wherein a precondition under which the server generates the digital certificate for the blockchain integrated station includes: the blockchain network generates a joining application confirmation message for the blockchain integrated station based on the description information of the blockchain integrated station;

in response to obtaining the digital certificate, broadcasting, by the blockchain integrated station, the digital certificate to one or more blockchain nodes of the blockchain network to add the blockchain integrated station as a blockchain node;

after joining the blockchain network as the blockchain node based on the digital certificate, obtaining, by the blockchain integrated station, the identity public key of the server and maintaining the identity public key of the server in a cryptographic acceleration card of the blockchain integrated station, wherein the cryptographic acceleration card is capable of performing key management, encryption and decryption, and signature verification for the blockchain integrated station;

obtaining, by the blockchain integrated station, to-be-verified contract information of an off-chain contract;

performing, by the cryptographic acceleration card of the blockchain integrated station, a signature verification on the to-be-verified contract information using the identity public key of the server maintained in the cryptographic acceleration card;

after the signature verification on the to-be-verified contract information is passed, transmitting, by the blockchain integrated station, a ciphertext request to the server, wherein the ciphertext request comprises first information associated with input data of the off-chain contract; and receiving, by the blockchain integrated station and from the server, an execution result, wherein the execution result is obtained by the server by executing the off-chain contract using the input data.

19. The computer-implemented system of claim 18, wherein the off-chain contract is stored in the server, wherein the first information comprises the input data and a contract address of the off-chain contract, and wherein the execution result is obtained by the server by executing the off-chain contract corresponding to the contract address to compute the input data based on an execution engine deployed in a trusted execution environment.

20. The computer-implemented system of claim 18, the operations comprising:

obtaining, by the blockchain integrated station, a remote certificate report for a trusted execution environment, wherein the remote certificate report is generated by an authentication server by verifying self-recommendation information generated by the server for the trusted execution environment; and in response to determining that the trusted execution environment is trustworthy based on the remote certificate report:

performing, by the blockchain integrated station, a contract information verification on the to-be-verified contract information based on contract information of the off-chain contract, wherein the to-be-verified contract information is signed by the server in the trusted execution environment using the identity private key of the server, and wherein the identity private key of the server is stored in the trusted execution environment; and in response to determining that the signature verification and the contract information verification are passed, determining, by the blockchain integrated station, that the off-chain contract is trustworthy.

* * * * *